(12) United States Patent
Hester, Jr.

(10) Patent No.: US 9,863,739 B2
(45) Date of Patent: Jan. 9, 2018

(54) VERTICAL DROP SEGMENTED MUNITIONS DISPENSER

(71) Applicant: The Boeing Company, Chicago, IL (US)

(72) Inventor: William C. Hester, Jr., Allen, TX (US)

(73) Assignee: The Boeing Company, Chicago, IL (US)

( * ) Notice: Subject to any disclaimer, the term of this patent is extended or adjusted under 35 U.S.C. 154(b) by 79 days.

(21) Appl. No.: 14/861,010

(22) Filed: Sep. 22, 2015

(65) Prior Publication Data

US 2017/0082397 A1 Mar. 23, 2017

(51) Int. Cl.
| | |
|---|---|
| *B64D 1/04* | (2006.01) |
| *F41F 5/00* | (2006.01) |
| *F41G 7/00* | (2006.01) |
| *F41G 7/22* | (2006.01) |
| *F41G 7/34* | (2006.01) |
| *F41G 9/00* | (2006.01) |
| *B64D 1/06* | (2006.01) |
| *F41F 3/065* | (2006.01) |

(52) U.S. Cl.
CPC ............... *F41F 5/00* (2013.01); *B64D 1/06* (2013.01); *F41F 3/065* (2013.01); *F41G 7/007* (2013.01); *F41G 7/226* (2013.01); *F41G 7/2293* (2013.01); *F41G 7/346* (2013.01); *F41G 9/002* (2013.01)

(58) Field of Classification Search
CPC ............... B64D 1/04; F41F 5/00; F41F 3/065
See application file for complete search history.

(56) References Cited

U.S. PATENT DOCUMENTS

| | | | | |
|---|---|---|---|---|
| 1,342,802 A | * | 6/1920 | Gerli | B64D 1/04 102/477 |
| 1,716,795 A | * | 6/1929 | Remey | G09F 21/16 40/213 |
| 3,534,653 A | * | 10/1970 | Specht | F41F 3/06 102/393 |
| 4,307,650 A | * | 12/1981 | Kuesters | B64D 7/00 89/1.56 |
| 8,893,605 B1 | | 11/2014 | Hester et al. | |
| 2007/0068373 A1 | * | 3/2007 | McCantas, Jr. | B64D 1/04 89/1.11 |
| 2012/0118212 A1 | * | 5/2012 | Travis | B64D 1/02 114/1 |
| 2012/0125183 A1 | * | 5/2012 | Zatterqvist | B64D 7/00 89/1.51 |

FOREIGN PATENT DOCUMENTS

| | | | | |
|---|---|---|---|---|
| DE | 2822355 A1 | * | 11/1979 | B64D 1/04 |
| DE | FR 2547044 A1 | * | 12/1984 | F41G 3/22 |
| FR | 2987032 A1 | * | 8/2013 | F41F 3/06 |
| FR | WO 2013121031 A2 | * | 8/2013 | F41F 3/06 |

* cited by examiner

*Primary Examiner* — Gabriel Klein
(74) *Attorney, Agent, or Firm* — Felix L. Fischer (57) ABSTRACT

A munitions dispenser employs a plurality of launch tubes mounted in an array as a segmented dispenser assembly. Each tube in the array is configured to carry a selected munition releasably coupled in a cylindrical bore of the tube for substantially vertical release through a lower aperture. A frame, mountable to an air vehicle, carries the array of launch tubes. A skin covers the array of launch tubes with the skin and frame with the array configured for nested engagement of multiple segmented assemblies.

20 Claims, 6 Drawing Sheets

VERTICAL DROP SEGMENTED MUNITIONS DISPENSER

BACKGROUND INFORMATION

Field

Embodiments of the disclosure relate generally to the field of air dropped munitions and more particularly to a dispenser for vertical deployment of mortar type munitions from unmanned aerial vehicles.

Background

Armed unmanned aerial vehicles (UAVs) are currently in service. The majority carry a low number of missiles or other ordinance and are not generally used in a Close Air Support (CAS) role. Existing mortar pod munitions segments use one or more door assemblies that are opened and closed with an internal rack assembly that suspends munitions in a conventional horizontal position to be released after the doors are opened. This method to dispense munitions may add weight and cost to the dispenser.

It is therefore desirable to provide simplified dispenser mountable to a UAV for carriage and release of multiple munitions applicable to a CAS role.

SUMMARY

Embodiments disclosed herein provide a munitions dispenser having a plurality of launch tubes mounted in an array as a segmented dispenser assembly. Each tube in the array is configured to carry a selected munition releasably coupled in a cylindrical bore of the tube for substantially vertical release through a lower aperture. A frame, mountable to an air vehicle, carries the array of launch tubes. A skin covers the array of launch tubes with the skin and frame with the array configured for nested engagement of multiple segmented assemblies.

The segmented assemblies may be mounted in a dispenser pod in certain embodiments wherein an electronics segment having a frame and skin adapted for nested engagement with a segmented dispenser assembly is mounted with one or more segmented dispenser assemblies.

The embodiments provide a method for munitions dispensing wherein one or more munitions dispenser segments are assembled into a pod. The tubes of each dispenser segment are then configured with or without sleeves to accommodate a desired load of munitions of varying sizes. The associated munitions are then loaded into the tubes and the pod is mounted to a UAV.

The features, functions, and advantages that have been discussed can be achieved independently in various embodiments of the present disclosure or may be combined in yet other embodiments further details of which can be seen with reference to the following description and drawings.

Each figure shown in this disclosure shows a variation of an aspect of the embodiments presented, and only differences will be discussed in detail.

DETAILED DESCRIPTION

Embodiments disclosed herein provide a munitions dispenser having tubes oriented for vertical drop assembled in an array within a segment that may be coupled with other segments into an integrated ordinance dispenser pod. Each tube may be configured for housing a desired munition type including 81 mm (e.g., Laser/GPS) guided mortar (e.g., 10 lb. class), 120 mm (e.g., Laser/GPS) guided mortar (e.g., 35 lb. class), folding wing munitions and small and micro air deployable UAVs capable of self-guidance beyond ballistic profiles or other ordinance. The tubes may be configured with internal sleeves to accommodate munitions with differing diameters.

Figure 1A:
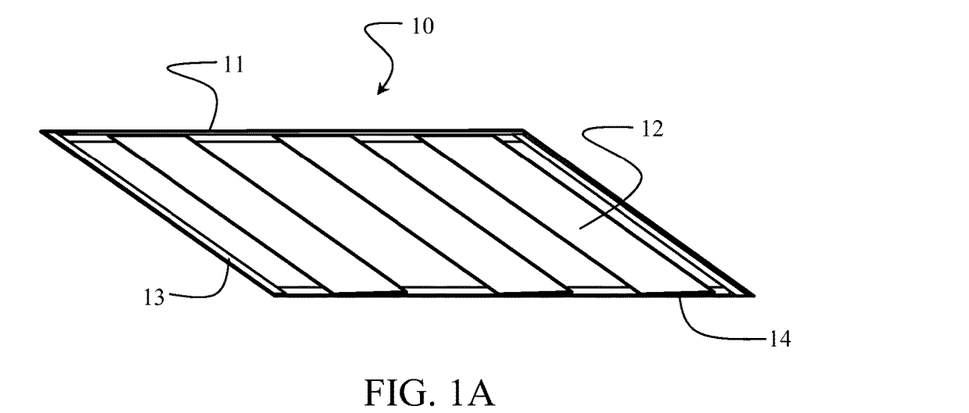
FIG. 1A is a side view illustration of an embodiment of a vertical drop segmented munitions dispenser.
Figure 1B:
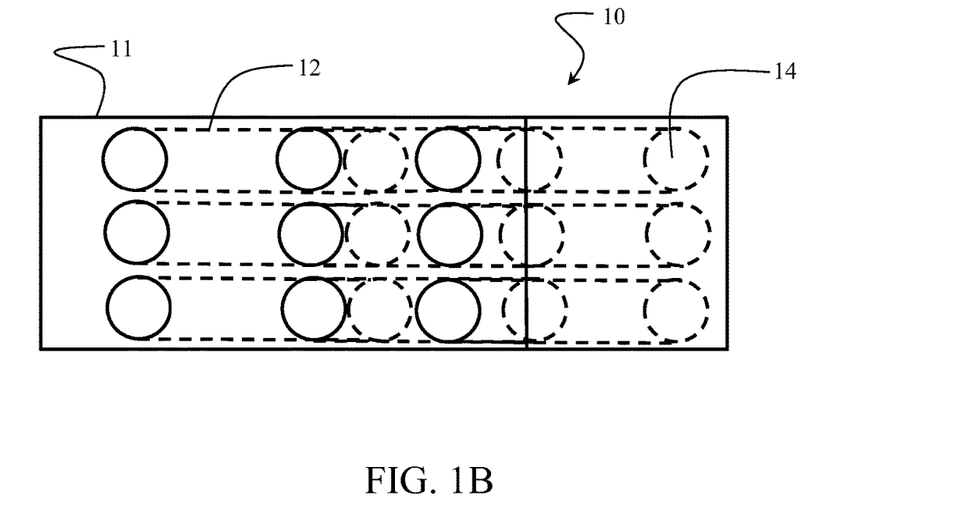
FIG. 1B is a top view illustration of the embodiment of FIG. 1A.
Figure 1C:
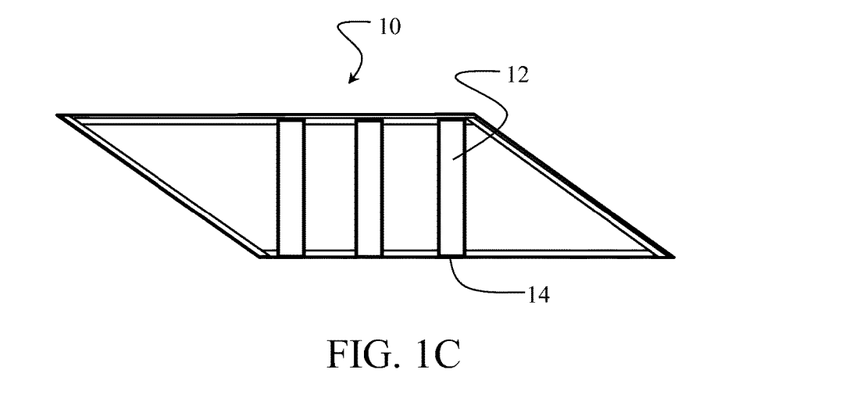
FIG. 1C is a side view illustration of an alternative embodiment with vertically mounted tubes.
Figure 1D:
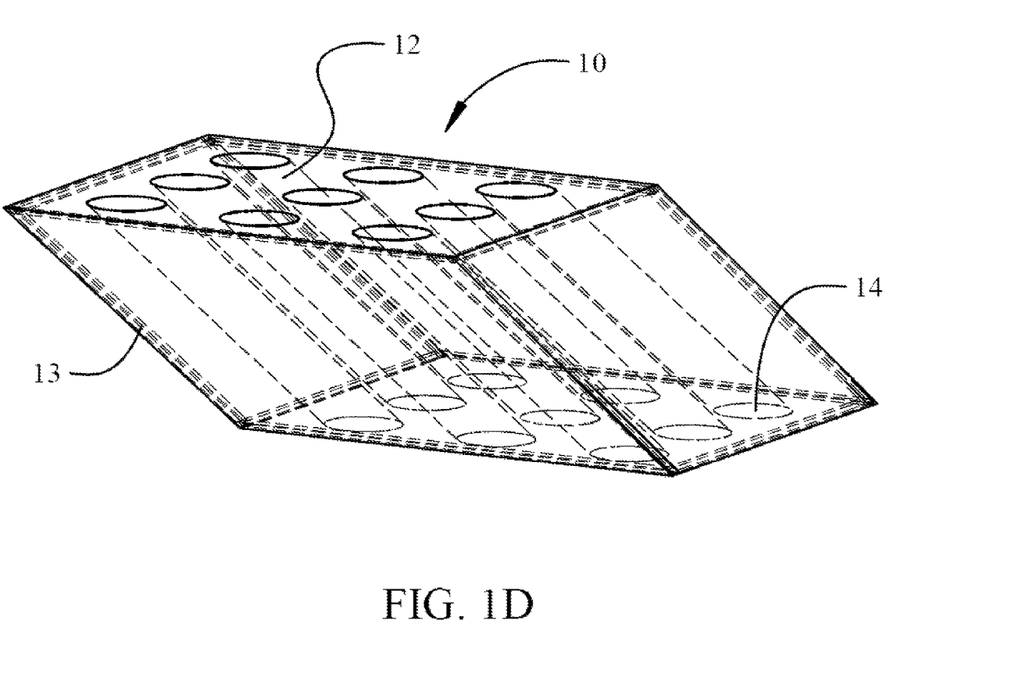
FIG. 1D is a perspective illustration of the embodiment of FIGS. 1A and 1B with internal elements shown in phantom.

Referring to the drawings, FIGS. 1A and 1B show an exemplary embodiment of a munitions dispenser segment 10 having multiple launch tubes 12 arranged in an array. The dispenser segment 10 may have an aerodynamic covering or skin 11 surrounding the tube array with the individual tubes in the array supported within a structural frame 13 on which the skin is mounted. The tubes 12 are configured to support various munitions, as will be described in greater detail subsequently, and allow dispensing of the munitions through a lower aperture 14 with a substantially vertical release which may be gravity induced. For the embodiment shown, the tubes are mounted in the dispenser segment 10 in an orientation inclined to the rear of the munitions dispenser to enhance munitions separation from an air vehicle having a forward velocity during dispensing. However, in alternative embodiments a true vertical orientation may be employed as shown in FIG. 1C. FIG. 1D provides an exemplary perspective view of the embodiments of FIGS. 1A and 1B.

Figure 2:
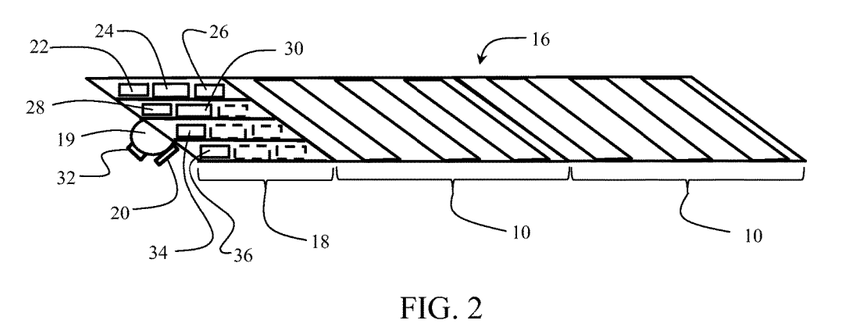
FIG. 2 is a side view illustration of a modular assembly of dispenser segments employing embodiments as shown in FIGS. 1A and 1B with additional segments including control electronics and sensor systems.

As seen in FIG. 2, the multiple dispenser segments 10 may be joined into an integrated munitions dispenser pod 16 which may also include an electronics segment 18 coupled to the one or more ordnance dispenser segments 10. The structural frames and skins of the dispenser and electronics segments may be adapted for nested joining of the segments providing a substantially continuous skin over the extent of the pod for aerodynamic efficiency. In the embodiment shown in FIG. 2, two dispenser segments 10 are shown but one or more segments may be employed in a pod 16.

The electronic section segment 18 may incorporate, for example, a target acquisition sensor 19, a target designator 20, a ballistic computer (comprising hardware and software) 22, a communication module 24, a power supply 26, a processor module 28, and a memory module 30. The target acquisition sensor 19 may be coupled within the integrated munitions dispenser pod 16 and may be configured to sense a target. The target acquisition sensor 19 may include an optical target acquisition element 32 and electronic target acquisition support components 34. The target acquisition sensor 19 may be, for example but without limitation, an electronic sensor, an optical sensor, and an infra-red sensor, or other sensor. The target designator 20 may be coupled to the target acquisition sensor 19 and may be configured to designate the sensed target. The target designator 20 may also include electronic designator support components 36. The target designator 20 may comprise, for example but without limitation, a laser designator, a GPS sensor, or other sensor compatible with associated guidance systems on the munitions carried in the pod. The ballistic computer 22 may be coupled to the target designator 20 and may be configured to compute ordnance release timing for ballistic release of each type of munition contained in the launch tubes 12 according to the sensed target. The communication module 24 may be coupled to the ballistic computer 22 and may be configured to exchange ordnance release timing for remote activation or recording. The power supply 26 may be coupled to the ordnance dispenser pod and may be configured to supply power to the components in the electronics segment 18 or the dispenser segments 10. For the embodiment shown in FIG. 2, the various components in the electronics segment 18 are shown in schematic or block diagram form and the orientation, arrangement and support of the components is exemplary. No limitation as to physical form or arrangement of the components is implied.

The processor module (comprising hardware and software) 28 may incorporate processing logic that is configured to carry out the functions, techniques, and processing tasks associated with the operation of the pod 16. For example, the processor module 28 may receive input from the target sensing system 19 and may provide an output to the target designator 20. The processor module 28 may provide data from the memory module 30 to the ballistic computer 22, for example but without limitation, an airspeed, an altitude, a time of release, or other data. The processor module 28 may also access data stored in various databases in the memory module 30, to support functions of the pod 16 including activating the ordnance release mechanism in the ordnance dispenser segments 10 in response to detecting the ordnance release timing from the communication module 24. The processor module 28 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein.

The memory module 30 may be a data storage area with memory formatted to support the operation of the pod 16. The memory module 30 is configured to store, maintain, and provide data as needed to support functionality of the pod 16 in the manner described below. In practical embodiments, the memory module 30 may be, for example but without limitation, a non-volatile storage device (non-volatile semiconductor memory, hard disk device, optical disk device, and the like), a random access storage device (for example, SRAM, DRAM), or any other form of storage medium known in the art.

Additionally, the memory module 30 may represent a dynamically updating database containing a table for updating various targeting, navigation or other databases. The memory module 30 may also store, the data mentioned above, a computer program that is executed by the processor module 28, an operating system, an application program, tentative data used in executing a program, or other application or data.

The memory module 30 may be coupled to the processor module 28 such that the processor module can read information from and write information to the memory module 30. As an example, the processor module 28 and memory module 30 may reside in respective application specific integrated circuits (ASICs). The memory module 30 may also be integrated into the processor module 28. In an exemplary embodiment, the memory module 30 may comprise a cache memory for storing temporary variables or other intermediate information during execution of instructions to be executed by the processor module 28.

Figure 3A:
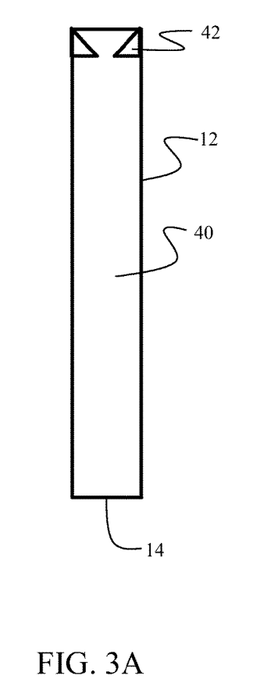
FIG. 3A is a side section view illustrating one exemplary configuration of a dispenser tube for the vertical drop segmented munitions dispenser.

An individual dispenser tube 12 is shown in FIG. 3A. Each tube 12 provides a cylindrical bore 40 in which munitions may be housed within the dispenser 10. A retention mechanism 42 is provided proximate an upper extent of the tube to releasably couple a munition into the tube. Upon release of the retention mechanism 42, the carried munition is deployed by gravity through the aperture 14 in the lower extent of the tube 12.

Figure 3B:
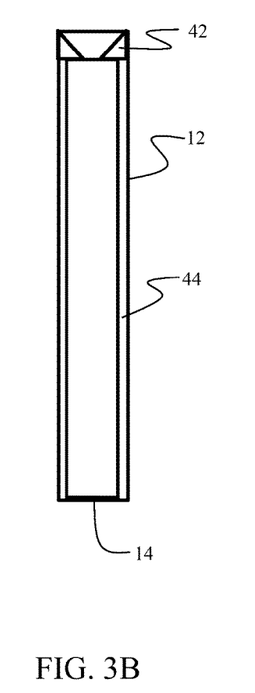
FIG. 3B is a section view illustrating a size adjustment sleeve inserted into the dispenser tube to accommodate alternative diameter munitions.
Figure 3C:
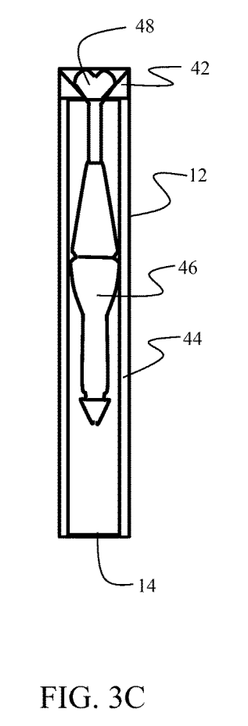
FIG. 3C is a section view of the dispenser tube of FIG. 3B with a mortar round inserted.

Munitions of differing diameter or type may be selected to be carried in the tubes 12. A sleeve 44 may be removably inserted into a selected tube to alter the diameter or configuration of the cylindrical bore 40 as shown in FIG. 3B. A smaller diameter munition such as an 81 mm mortar round 46 may then be housed within the tube 12 as shown in FIG. 3C. Use of insertable sleeves allows the base diameter of the tube to be sized for the diameter of the largest desired munition to carried, such as a 120 mm mortar round, with sleeves inserted for any smaller diameter munition. The tubes 12 may constitute US Common Launch Tubes or the sleeves may constitute US Common Launch Tubes mounted within the tubes 12 to accommodate the selected munitions. In the exemplary embodiment, the retention mechanism 42 engages tail fins 48 on the mortar round 46. In various embodiments, the sleeve 44 may incorporate alternative or supplemental restraining elements as required to engage the munition to be carried.

Figure 3D:
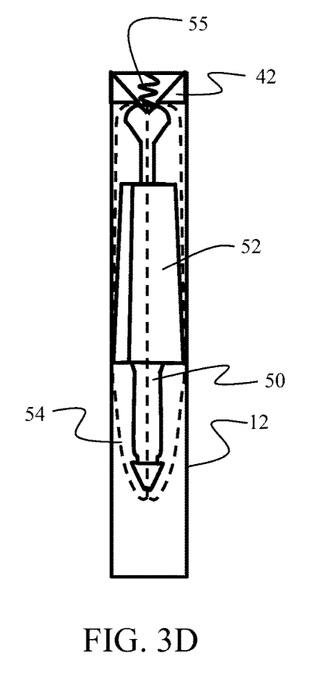
FIG. 3D is a section view of the dispenser tube of FIG. 3A with a munition having folding wings inserted.

Self-guided munitions such as a device 50 incorporating folding wings 52 may also be accommodated in the tubes 12 as shown in FIG. 3D. A selected munition as detailed above comprise a 120 mm mortar round, a 81 mm mortar round or a winged self-guided munition. In certain embodiments an ejectable fairing 54 (shown in phantom) which is released or ejected from the munition upon exiting the tube 12, may be employed for enhanced transition through the tube, environmental separation of the munition during carry or aerodynamic considerations during deployment. Such a fairing may be used in combination with a sleeve or as an alternative to a sleeve in the tube. In certain embodiments, a spring 55 or similar device may be employed to assist in ejection of the munition from the tube upon actuation of the release mechanism.

Figure 3E:
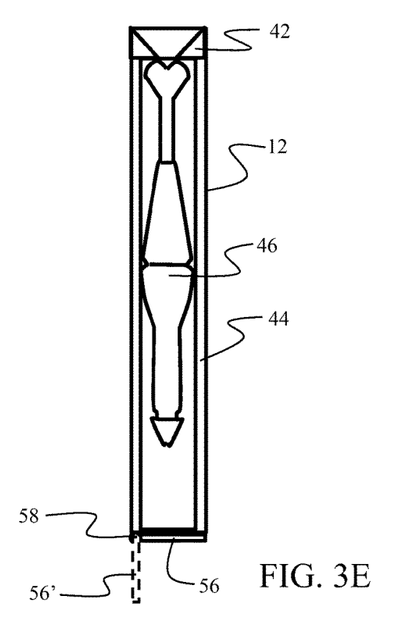
FIG. 3E is a section view of the dispenser tube of FIG. 3B with a rotatable door covering the exit aperture.

In certain embodiments for aerodynamic efficiency or to provide environmental protection for the carried munitions, such as mortar round 46, a door 56 may be employed to cover the aperture 14 of the tube 12 as shown in FIG. 3E. The door may be frangible and pierced by the exiting munition or may be pivotable about a hinge 58 to an open position (shown in phantom as element 56') exposing the aperture 14. The hinged door may merely be displaced by the exiting munition or may have active actuators to open the door under command of the processor module 28.

Figure 4:
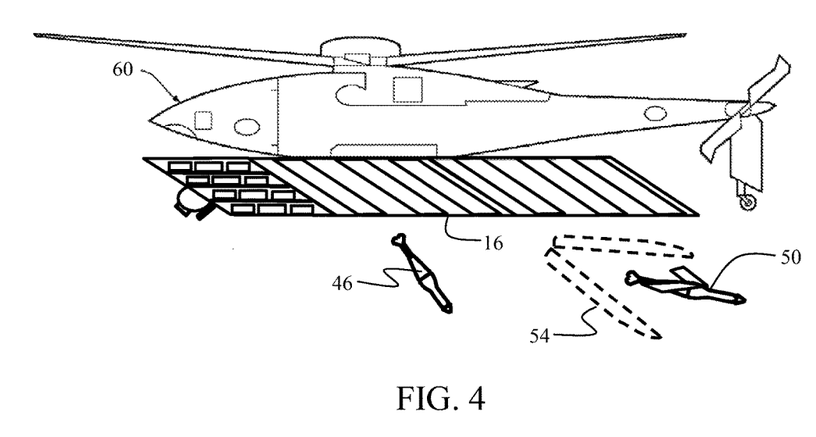
FIG. 4 is an exemplary illustration of a UAV with the modular assembly of the vertical drop segmented munitions dispenser mounted for operation.

The integrated munitions dispenser pod 16 is mountable on an air vehicle or other platform as shown in FIG. 4. For the example shown, a vertical takeoff and landing (VTOL) UAV 60 is employed. However, in alternative embodiments a conventional winged UAV or manned helicopter or aircraft may be employed. In certain embodiments, navigation and control of the UAV may be accomplished by the processor module 28 and associated electronics in the electronics segment 18 of the pod 16. Alternatively, the UAV may incorporate guidance, control and targeting systems which may supplement or substitute for a portion or all of the functionality of the elements in the electronics segment 18 allowing the pod to employ only munitions dispenser segments 10.

Figure 5:
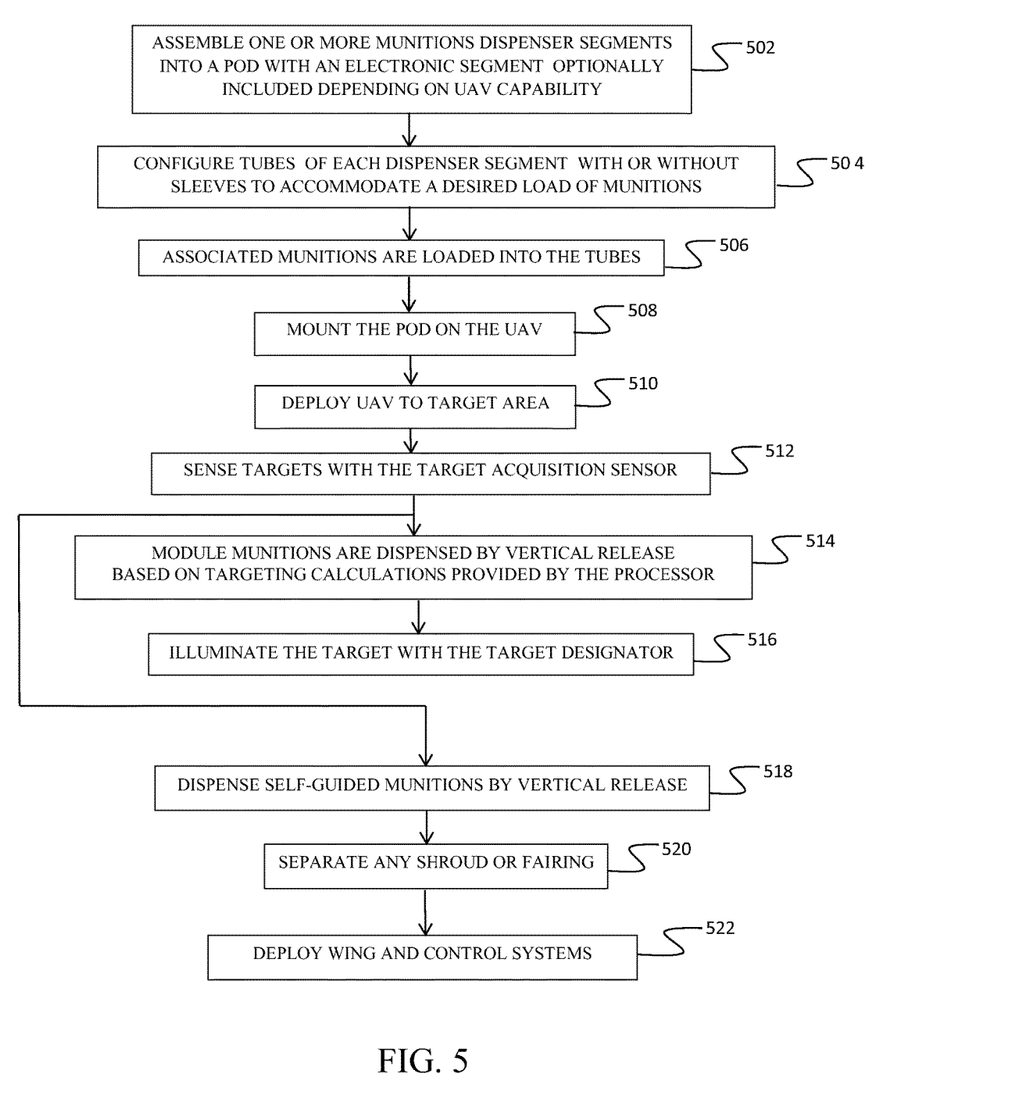
FIG. 5 is a flow chart describing exemplary elements of a method of operation of a UAV employing the vertical drop segmented munitions dispenser.

As described in FIG. 5 in conjunction with FIG. 4, operation of the integrated munitions dispenser pod 16 is accomplished by assembly of one or more munitions dispenser segments 10 into the pod with an electronic segment 18 optionally included depending on capability of the UAV to which the pod will be attached, step 502. The tubes 12 of each dispenser segment 10 are configured with sleeves or un-sleeved to accommodate a desired load of munitions of varying sizes, step 504, and associated munitions are loaded into the tubes, step 506. The pod 16 is mounted to the UAV 60, step 508. The UAV is then deployed to a desired target area, step 510, using either on board guidance and navigation systems or data provided by the electronic segment of the pod 16. Sensing of targets is then accomplished by the target acquisition sensor 19, step 512, and based on targeting calculations provided by the processor module 28, munitions are dispensed by vertical release, step 514, to engage the targets. For appropriately configured munitions, the target designator 20 may be employed to illuminate the target, step 516, for munitions guidance. Self-guided munitions 50 may also be dispensed by vertical release, step 518, after which separation of any shroud or fairing 54 may occur, step 520, and deployment of wing and control systems may be accomplished, step 522.

Figure 6:
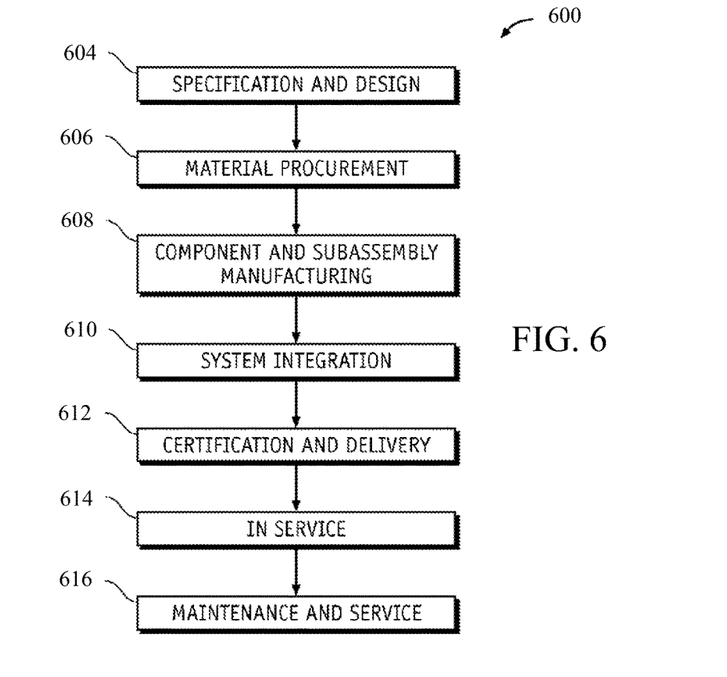
FIG. 6 is a flow chart depicting an aircraft manufacturing and service method in which the disclosed embodiments may be employed; and, FIG. 7 is a block diagram depicting an aircraft with which the disclosed embodiments may be employed.
Figure 7:
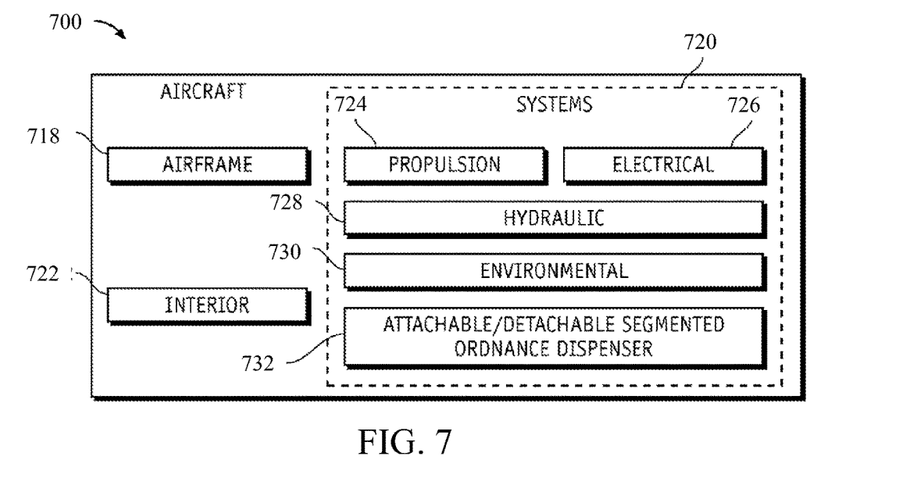

Embodiments of the disclosure may be described in the context of an aircraft manufacturing and service method 600 (method 600) as shown in FIG. 6 and an aircraft 700 as shown in FIG. 7. During pre-production, the exemplary method 600 may include specification and design 604 of the aircraft 700 and material procurement 606. During production, component and subassembly manufacturing 608 and system integration 610 of the aircraft 700 takes place. Thereafter, the aircraft 700 may go through certification and delivery 612 in order to be placed in service 614. While in service by a customer, the aircraft 700 is scheduled for routine maintenance and service 616 (which may also include modification, reconfiguration, refurbishment, and so on).

Each of the processes of method 600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be without limitation an airline, leasing company, military entity, service organization, and the like.

As shown in FIG. 7, the aircraft 700 produced by the exemplary method 600 may include an airframe 718 with a plurality of systems 720 and an interior 722. Examples of high-level systems 720 include one or more of a propulsion system 724, an electrical system 726, a hydraulic system 728, an environmental system 730, and an attachable/detachable segmented ordnance dispenser 732. Any number of other systems may also be included. Although an aerospace example is shown, the embodiments of the disclosure may be applied to other industries.

Apparatus and methods embodied herein may be employed during any one or more of the stages of the production and service method 600. For example, components or subassemblies corresponding to production process 608 may be fabricated or manufactured in a manner similar to components or subassemblies produced while the aircraft 700 is in service. In addition, one or more apparatus embodiments, method embodiments, or a combination thereof may be utilized during the production stages 608 and 610, for example, by substantially expediting assembly of or reducing the cost of an aircraft 700. Similarly, one or more of apparatus embodiments, method embodiments, or a combination thereof may be utilized while the aircraft 700 is in service, for example and without limitation, to maintenance and service 616.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A munitions dispenser comprising:
    a plurality of launch tubes mounted in an array as a segment, each tube in the array configured to carry a selected munition releasably coupled in a cylindrical bore of the tube for substantially vertical release through a lower aperture;
    a frame carrying the array of launch tubes, said frame mountable to an air vehicle; and,
    a skin covering the array of launch tubes, said skin and frame with the array configured for nested engagement of multiple additional munitions dispensers as a segmented dispenser assembly, wherein each of the multiple additional munitions dispensers includes a plurality of launch tubes mounted in an additional array as an additional segment, each tube in the additional array configured to carry a selected munition releasably coupled in a cylindrical bore thereof for substantially vertical release through a lower aperture, an additional frame carrying the additional array of launch tubes, said additional frame mountable to an air vehicle, and a skin covering the additional array of launch tubes.

2. The munitions dispenser as defined in claim 1 further comprising at least one sleeve mountable in the cylindrical bore of at least one of the plurality of tubes, said sleeve adapted to closely receive one type of munition available as a selected munition.

3. The munitions dispenser as defined in claim 1 further comprising a retention mechanism adapted to releasably constrain the selected munition in the cylindrical bore.

4. The munitions dispenser as defined in claim 1 wherein the array of launch tubes comprise a plurality of US Common Launch Tubes, tubes sleeved with US Common Launch Tubes, tubes containing sleeves of a diameter accommodating expandable folded wings equipped munitions, un-sleeved tubes or a combination thereof.

5. The munitions dispenser as defined in claim 1 wherein the array of tubes are inclined to a rear of the munitions dispenser to enhance munitions separation.

6. The munitions dispenser as defined in claim 1 further comprising an electronics segment having a frame and skin adapted for nested engagement with at least one segmented dispenser assembly to form a munitions dispenser pod.

7. The munitions dispenser defined in claim 6 wherein the electronics segment comprises a target acquisition sensor and a target designator.

8. The munitions dispenser as define in claim 7 wherein the electronic segment further comprises a processor module and a memory module, said processor module connected to receive input from the target acquisition sensor and provide an output to the target designator; a ballistic computer, a communication module and a power supply, said ballistic computer operable to define timing for ballistic release of munitions carried in the tube array, said communications module adapted to exchange ordnance release timing with the ballistic computer for remote activation, recording, or a combination thereof.

9. The munitions dispenser as defined in claim 2 wherein the selected munition comprises a 120 mm mortar round, a 81 mm mortar round or a winged self-guided munition.

10. A munitions dispenser pod comprising:
at least one segment having
a plurality of launch tubes mounted in an array, each tube in the array configured to carry a selected munition releasably coupled in a cylindrical bore of the tube for substantially vertical release through a lower aperture;
a frame carrying the array of launch tubes, said frame mountable to an air vehicle;
a skin covering the array of launch tubes, said skin and frame with the array configured for nested engagement of multiple additional segments as an assembly, wherein each additional segment includes a plurality of launch tubes mounted in an additional array, each tube in the additional array configured to carry a selected munition releasably coupled in a cylindrical bore thereof for substantially vertical release through a lower aperture, an additional frame carrying the additional array of launch tubes, said additional frame mountable to an air vehicle, and a skin covering the additional array of launch tubes; and
an electronics segment having a frame and skin adapted for nested engagement with the at least one segment.

11. The munitions dispenser pod as defined in claim 10 wherein the at least one segment comprises a plurality of segments mounted in nested engagement.

12. The munitions dispenser as defined in claim 10 further comprising at least one sleeve mountable in the cylindrical bore of at least one of the plurality of tubes, said sleeve adapted to closely receive one type of munition available as a selected munition.

13. The munitions dispenser as defined in claim 10 further comprising a retention mechanism adapted to releasably constrain the selected munition in the cylindrical bore.

14. The munitions dispenser as defined in claim 10 wherein the array of launch tubes comprise a plurality of US Common Launch Tubes, tubes sleeved with US Common Launch Tubes, tubes containing sleeves of a diameter accommodating expandable folded wings equipped munitions, un-sleeved tubes or a combination thereof.

15. The munitions dispenser as defined in claim 10 wherein the array of tubes are inclined to a rear of the munitions dispenser pod to enhance munitions separation.

16. A method for dispensing munitions comprising:
mounting in a frame a plurality of launch tubes in an array as a segment with or without sleeves to accommodate a desired load of selected munitions of varying sizes, each tube in the array configured to carry a selected munition releasably coupled in a cylindrical bore of the tube for substantially vertical release through a lower aperture and covering the array of launch tubes with a skin, said skin and frame with the array configured for nested engagement of multiple additional assemblies, wherein each additional assembly includes a plurality of launch tubes mounted in an additional array, each tube in the additional array configured to carry a selected munition releasably coupled in a cylindrical bore thereof for substantially vertical release through a lower aperture, an additional frame carrying the additional array of launch tubes, said additional frame mountable to an air vehicle, and a skin covering the additional array of launch tubes;
releasably coupling the selected munitions into the cylindrical bores of the tubes; and
mounting the frame to a UAV.

17. The method as defined in claim 16 further comprising mounting an electronic segment nested with the segment.

18. The method as defined in claim 17 further comprising:
deploying the UAV to a desired target area using either an on board guidance and navigation systems or a data provided by the electronic segment of the pod;
sensing of targets by a target acquisition sensor;
dispensing munitions by vertical release from the tubes to engage the targets.

19. The method as defined in claim 18 further comprising employing a target designator to illuminate the target for munitions guidance.

20. The method as defined in claim 18 further comprising:
dispensing self-guided munitions by vertical release;
separating any shroud or fairing; and,
deploying wing and control systems on the munition.

* * * * *